(12) United States Patent
Buesing et al.

(10) Patent No.: US 6,910,051 B2
(45) Date of Patent: Jun. 21, 2005

(54) METHOD AND SYSTEM FOR MECHANISM FOR DYNAMIC EXTENSION OF ATTRIBUTES IN A CONTENT MANAGEMENT SYSTEM

(75) Inventors: Rainer Buesing, Stuttgart (DE);
Thorsten Gau, Barsbuettel (DE);
Holger Juschkewitz,
Leinfelden-Echterdingen (DE)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 10/087,020

(22) Filed: Feb. 28, 2002

(65) Prior Publication Data

US 2002/0138503 A1 Sep. 26, 2002

(30) Foreign Application Priority Data

Mar. 22, 2001 (DE) .......................................... 01107130

(51) Int. Cl.[7] .................. G06F 12/00; G06F 17/30; G06F 7/00
(52) U.S. Cl. ......................... 707/200; 707/201; 707/2
(58) Field of Search ................................ 707/102, 203, 707/10, 104.1, 8, 2, 103 R, 200, 201

(56) References Cited

U.S. PATENT DOCUMENTS

| 5,181,162 A | | 1/1993 | Smith et al. ................. 364/419 |
| 5,752,017 A | * | 5/1998 | Bhargava et al. .............. 707/2 |
| 5,802,524 A | * | 9/1998 | Flowers et al. .......... 707/103 R |
| 5,838,965 A | * | 11/1998 | Kavanagh et al. ...... 707/103 R |
| 5,999,940 A | * | 12/1999 | Ranger .................... 707/103 R |
| 6,049,799 A | * | 4/2000 | Mangat et al. ................ 707/10 |
| 6,052,693 A | * | 4/2000 | Smith et al. ............. 707/104.1 |
| 6,088,691 A | * | 7/2000 | Bhargava et al. .............. 707/2 |
| 6,449,627 B1 | * | 9/2002 | Baer et al. ................... 715/514 |
| 6,457,017 B2 | * | 9/2002 | Watkins et al. ......... 707/103 R |
| 6,549,916 B1 | * | 4/2003 | Sedlar ........................ 707/200 |
| 6,704,747 B1 | * | 3/2004 | Fong ....................... 707/104.1 |
| 6,839,701 B1 | * | 1/2005 | Baer et al. ...................... 707/3 |
| 2002/0073115 A1 | * | 6/2002 | Davis ...................... 707/500.1 |

OTHER PUBLICATIONS

Gautam Bhargava, Piyush Goel, and Bala lyer discloses (1995), Hypergraph based reorderings of outer join queries with complex predicates, pp. 304–315.*

* cited by examiner

Primary Examiner—Frantz Coby
Assistant Examiner—Merilyn Nguyen
(74) Attorney, Agent, or Firm—Sawyer Law Group LLP

(57) ABSTRACT

A method and system for handling attributes in a document management system are disclosed. A system and method in accordance with the present invention uses virtual attributes for searching for attributes in child index classes for obtaining the corresponding parent index class in the search result. Therefore, multiple mapping of attributes via the class definitions can be performed, particularly during run-time of the underlying document management system. Accordingly, the obtained attribute hierarchy is hidden or transparent to a user of the system. In addition, a system and method in accordance with the present invention enables dynamic extension of attributes during run-time of the underlying document management system.

16 Claims, 2 Drawing Sheets

METHOD AND SYSTEM FOR MECHANISM FOR DYNAMIC EXTENSION OF ATTRIBUTES IN A CONTENT MANAGEMENT SYSTEM

FIELD OF THE INVENTION

The present invention relates to digital content or document management systems and, more specifically, to a method for administrating or handling attributes in such a system and to a corresponding document management system.

BACKGROUND OF THE INVENTION

Nowadays, content management systems (CMSs) are mainly used in the Internet arena in order to manage the content of a Web site. Typically, a CMS consists of two elements: A content management application (CMA) and a content delivery application (CDA). The CMA element allows a content manager or author of the Web site to manage the creation, modification, and removal of content from the Web site without needing expertise. The CDA element uses and compiles that information to update the Web site. The features of a CMS system vary, but most include Web-based publishing, format management, revision control, and indexing, search, and retrieval.

A CMS system may also provide tools for one-to-one marketing. One-to-one marketing is the ability of a Web site to tailor its content and advertising to a user's specific characteristics using information provided by the user or gathered by the site (for example, a particular user's page sequence pattern). For example, if one visits a search engine and searches for digital cameras, the advertising banners will advertise businesses that sell digital cameras instead of businesses that sell garden products.

An additional feature of a CMS is indexing, search, and retrieval. A CMS system typically indexes all data within an organization. Individuals can then search for data using keywords, which the CMS system retrieves. Indexing is also known in file management systems thus allowing records to be accessed either sequentially, i.e. in the order they were entered, or randomly i.e. using an index. Each index defines a different ordering of the records. An employee database may have several indexes, based on the information being sought. For example, a name index may order employees alphabetically by last name, while a department index may order employees by their department. A key is specified in each index. For an alphabetical index of employee names, usually the last name field is used as the key.

A corresponding document management system is disclosed in U.S. Pat. No. 5,181,162 in which documents are represented as collections of logical components i.e. "objects" that may be combined and physically mapped onto a page-by-page layout. Stored objects are organized, accessed and manipulated through a database management system.

In the above and other known document or content management systems, documents are stored as discrete objects in an object-oriented computational environment. Stored objects are organized, accessed and manipulated through a database management system (DBMS). A DBMS is a program or part of a database product, like the IBM DB2 database management products of the present assignee, that lets one or more computer users create and access data in a database. The DBMS manages user requests and requests from other programs so that users and other programs are free from having to understand where the data is physically located on storage media and, in a multi-user system, who else may also be accessing the data. In handling user requests, the DBMS ensures the integrity of the data that is, making sure it continues to be accessible and is consistently organized as intended. It further ensures security making sure only those with access privileges can access the data.

The DBMS thus allows for a coherent, consistent encoding of object content, object attributes and inter-object relationships. At a minimum, objects contain "content", that is, basic information-bearing constituents such as text, image, voice or graphics.

Objects may also contain so-called "attributes" specifying logical or physical relationships to other objects or to a document as a whole, characteristics relating to the appearance of the content, or access restrictions. In DBMSs, attributes are also used to describe a component of the database, such as a table or a field.

In general, an attribute typically is a property or characteristic of a data item like those attributes often used to assign access rights like 'read-only'. In the well-known Hypertext Markup Language (HTML), an attribute is used as a characteristic of a page element, such as a font. An HTML user can set font attributes, such as size and color, to different values. In some programming languages an attribute is a property of an object or may be considered a container for the property of the object. For example, color might be an attribute of a text object, containing the value of "red."

In using or programming computers, generally speaking, an attribute is a changeable property or characteristic of some component of a program that can be set to different values.

Objects may also be organized according to class, permitting multiple objects to inherit the same set of characteristics and attributes. For example, a document object may be sub-classified as a patent document, and, as a consequence, all patent documents may contain the same set of content objects.

Documents themselves can be represented as objects and collected into bundles referred to generally as "folders". These folders, too, can be represented as objects.

The above described document or content management systems use distinct index classes for different kinds of documents and folders. They offer a way to search for attributes that actually exist in a searched index class. Although these systems allow for linking documents to each other, these links are not used during the search process.

In addition, the known systems do not allow for parameterizing of the underlying document management system, e.g. to supplement or extend the system with further attributes or index classes, in particular during run-time, without need to alter or change the underlying document management system itself.

Accordingly, what is needed is a system and method for overcoming the above-identified problems. The present invention addresses such a need.

SUMMARY OF THE INVENTION

A method and system for handling attributes in a document management system are disclosed. In a first aspect, a method for handling attributes in a document management system is disclosed. The method comprises defining at least one child index class. The at least one child index contains at least one additional real attribute. The method further includes defining at least one corresponding parent index class. The at least one corresponding parent index class contains the at least one additional real attribute as a virtual attribute. In a second aspect, a method for handling attributes in a document management system comprises defining a document index class having a plurality of attributes and defining a folder index class having one attribute.

Finally, in a third aspect, a document management system is disclosed. The document management system comprises a document management interface. The document management interface includes a dynamic document description for definition of virtual and/or extended attributes and a first search engine. The document management system includes a content management system coupled to the document management interface, the content management system including a static document description and a second search engine.

A system and method in accordance with the present invention uses virtual attributes for searching for attributes in child index classes for obtaining the corresponding parent index class in the search result. Therefore, multiple mapping of attributes via the class definitions can be performed, particularly during run-time of the underlying document management system. Accordingly, the obtained attribute hierarchy is hidden or transparent to a user of the system. In addition, a system and method in accordance with the present invention enables dynamic extension of attributes during run-time of the underlying document management system.

DETAILED DESCRIPTION

The present invention relates to digital content or document management systems and, more specifically, to a method for administrating or handling attributes in such a system and to a corresponding document management system.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
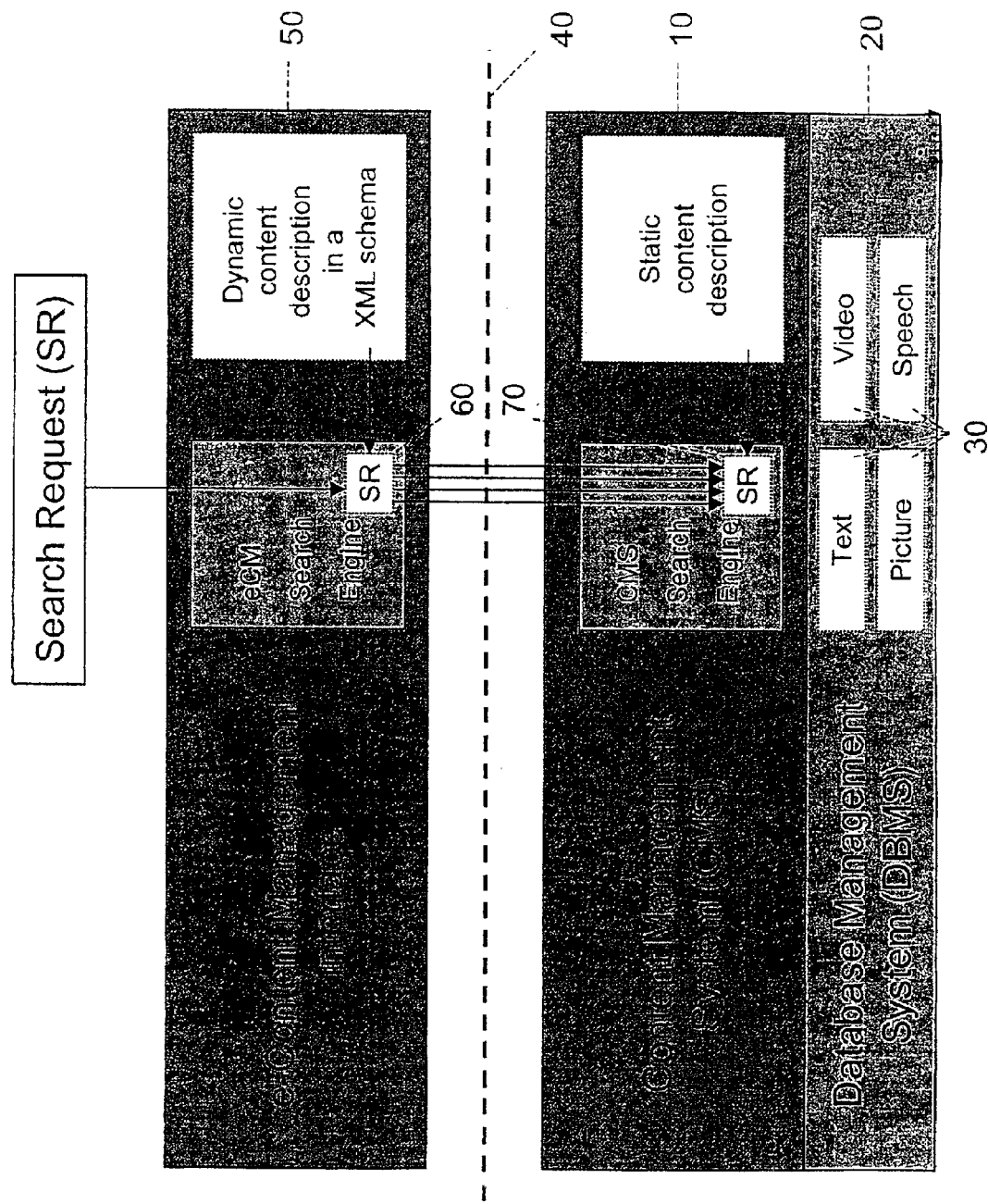
FIG. 1 is an overview block diagram for illustrating a content management system in accordance with the present invention.

FIG. 1 shows a content management system 10 (CMS) having implemented an attribute administration according to the invention. The CMS 10 uses a database management system 20 DBMS) to store and retrieve multimedia content 30, e.g. text, picture, speech, video, or the like.

The CMS 10 uses a static data model for search and retrieval operation on the content. This data model can not be changed or extended once the CMS 10 contains data. The dotted line 40 illustrates the boundary of the static content description.

An e-Content Management (eCM) interface opens up the static content description using its own data model defined in an XML (eXtensible Markup Language) schema. The eCM XML schema allows for a definition of virtual and extended attributes to widen the available search space for a user. The technical details of virtual and extended attributes are discussed below.

To the user, extended and virtual attributes appear as usual attributes defined in the CMS. The eCM interface 50 translates a search request performed by the user 60 into several CMS search requests 70. The interface 50, in addition, builds up the reply for the user of the CMS replies.

The content description used by the eCM interface 50 can be changed even if the CMS already contains data. Virtual and extended attributes can be added, modified or removed at any time and the user interface can adapt to these changes if desired.

Figure 2:
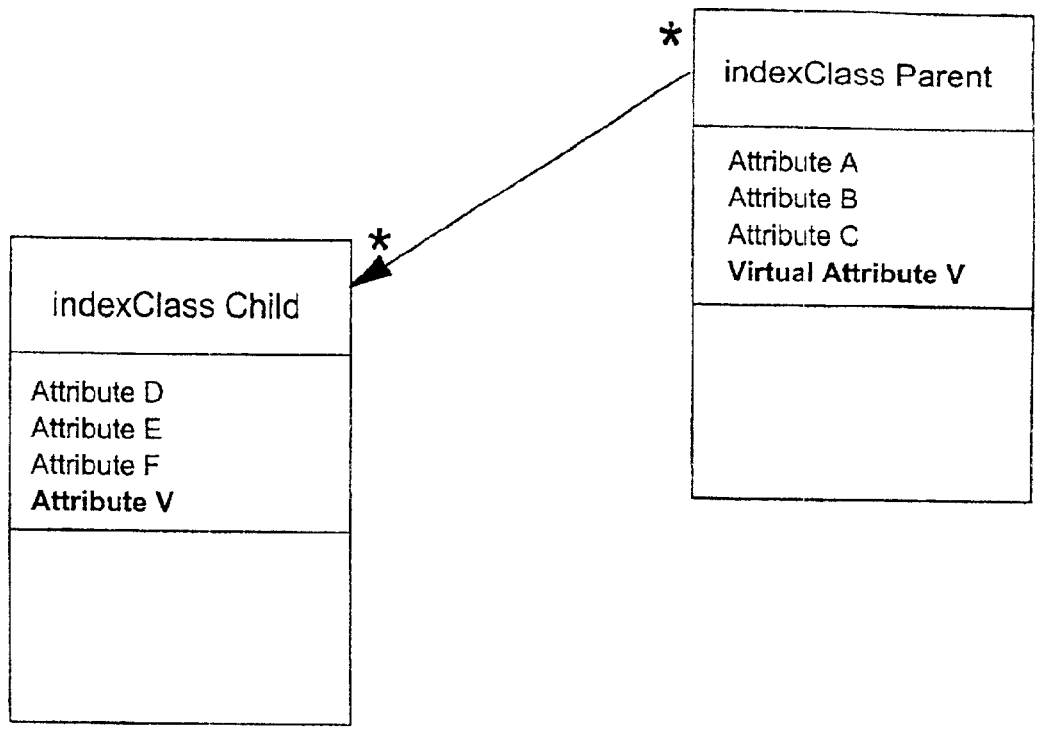
FIG. 2 is a schematic view of Index Class definitions according to a first embodiment of the invention.

FIG. 2 shows exemplary Parent and Child IndexClass definitions in order to illustrate the concept of Virtual Attributes according to the invention. Both IndexClass definitions include for example three attributes 'A'–'C,' 'D' and. 'E'.

In addition, the IndexClass Child contains an additional attribute 'V'. This attribute 'V' is to be used as a search criteria in the parent IndexClass. Therefore, the parent IndexClass has been extended by a user in order to provide an additional search criterion. This additional search criterion is called 'Virtual Attribute'.

The Virtual Attributes belong to a Child Index Class of the Content Manager and thus represent real attributes in the Child Index Class. Only in the corresponding Parent Index Class they are not existing physically, but only virtually. Thus the virtual attributes provide an additional search criterion for searches in one Index Class wherein one can search for the virtual attribute 'V' using only the corresponding Parent Index Class. The obtained search results (hits) then can be presented only as search results of the Parent Index Class and thus the performed search in the Child Index Class is hidden to the user.

If a search for a virtual attribute is to be done, the proposed mechanism performs the following steps:

Searching the child IndexClass for real attribute 'V';

for each search hit in the child IndexClass, obtaining the parent IndexClass;

building a list of the parent IndexClasses; and returning the list of parent IndexClasses with the virtual Attribute 'V'.

In other words, at first a search is performed in the Child Index Class and then, for all obtained search hits, the corresponding Parent Index Class is determined.

Figure 3:
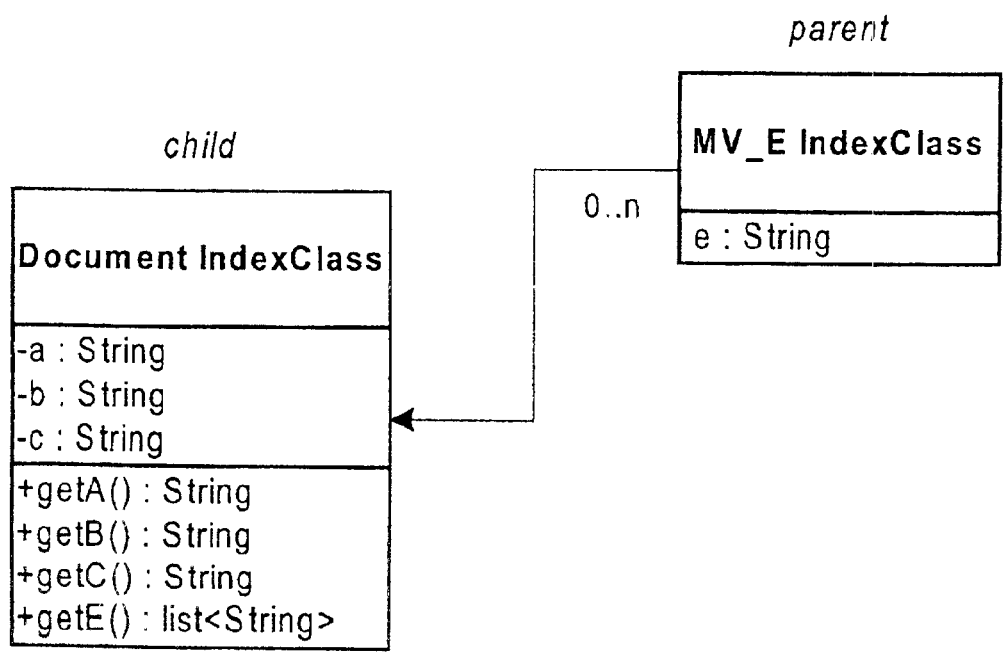
FIG. 3 is a similar view showing a second embodiment of the invention.

FIG. 3 shows an exemplary Parent IndexClass definition in order to illustrate the concept of Extended Attributes according to the invention. Hereby the IndexClass Parent defines, besides common attributes 'A'–'C', an extended attribute 'e'. The extended attribute 'e' is referencing to a further class "IndexClass MV_E" containing the real attribute 'E'.

These extended attributes may be used to implement "multi valued attributes". From the users point of view the Document has four attributes: A, B, C, E. Attributes A, B, C are single-valued, they can only contain one String wherein attribute E is multi-valued, i.e. it can contain the value zero or one or more Strings.

Extended attributes are implemented in a content management system using two index classes:

1. One document index class (called Document here) with three attributes and one folder index class (called MV_E here) with one attribute.

2. For each member in the list of attribute E a folder is created in the folder index class MV_E. The Document is than put into the folder. The folder is the parent, the document is the child.

If the attributes of a Document shall be displayed, the proposed mechanism performs the following steps:

Get all parent folders;

for each parent folder, get the attribute e and append it to the eList;

get the single-valued attributes of the document a, b, c and return a, b, c, eList.

If the user intends to search a Document by attribute E (with a single search value), the proposed mechanism performs the following steps:

search folder in index class MV_E where e=???;

for each found folder, get the child documents and add them to the resultSet

It should be mentioned that a set (=container with no duplicate members) is needed in the above scenario because multiple documents may have the same value in their E attribute, but we don't want them twice in the result.

If the user intends to search a Document by a list of attribute E, the proposed mechanism performs the following steps:

for each element in eList, search folder in index class MV_E where e=???;

for each found folder get the child documents and add them to the resultSet $r_i$;

build the intersection of all $r_i$.

It is noteworthy the above multiple values comprise an AND semantics.

The beforehand described extended attributes are mainly used to present search results in a Parent Class, e.g. on a GUI. They support implementation of attributes having a list of possible values.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for handling attributes in a document management system comprising:
    (a) defining at least one child index class, the at least one child index class contains at least one additional real attribute; and
    (b) defining at least one corresponding parent index class, the at least one corresponding parent index class contains the at least one additional real attribute as a virtual attribute.

2. The method of claim 1 which includes (c), searching for the virtual attribute.

3. The method of claim 2, wherein searching (c) further comprises:
    (c1) searching the at least one child index class for a real attribute related to the virtual attribute;
    (c2) obtaining the corresponding parent index class for each search hit in the at least one child index class;
    (c3) building a list of the obtained parent index classes; and
    (c4) returning the list of parent index classes with the virtual attribute.

4. A method for handling attributes in a document management system comprising:
    (a) defining a document index class having a plurality of attributes;
    (b) defining a folder index class having one attribute;
    (c) obtaining all parent folders corresponding to the folder index class;
    (d) obtaining an attribute and appending the attribute to a list for each obtained parent folder; and
    (e) obtaining single-valued attributes of a document and returning the single-valued attributes to the list for each obtained parent folder.

5. A document management system comprising:
    a document management interface, the document management interface including a dynamic document description for definition of virtual and/or extended attributes and a first search engine; and
    a content management system coupled to the document management interface, the content management system including a static document description and a second search engine.

6. The system of claim 5, wherein the document management interface also translates a search request into a number of document management system requests that can be utilized by the content management system.

7. The system of claim 5 in which the document management interface also defines at least one child index class, the at least one child index class contains at least one additional real attribute, and defines at least one corresponding parent index class, the at least one corresponding parent index class contains the at least one additional real attribute as a virtual attribute.

8. The system of claim 7 which the document management interface also searches for the virtual attribute.

9. The system of claim 8, wherein the document management interface searches the at least one child index class for a real attribute related to the virtual attribute, obtains the corresponding parent index class for each search hit in the at least one child index class, builds a list of the obtained parent index classes, and returns the list of parent index classes with the virtual attribute.

10. The system of claim 5 in which the document management interface also defines a document index class having a plurality of attributes, and defines a folder index class having one attribute.

11. The system of claim 10 in which the document management interface also presents the plurality of attributes of the document index class based upon the folder index class.

12. The system of claim 11, wherein the document management interface obtains all parent folders corresponding to the folder index class obtains an attribute and appending the attribute to a list for each obtained folder; and obtains single-valued attributes of the document and returning the single-valued attributes to the list.

13. A computer readable medium containing program instructions for handling attributes in a document management system, the program instructions for:
    (a) defining at least one child index class, the at least one child index class contains at least one additional real attribute; and
    (b) defining at least one corresponding parent index class, the at least one corresponding parent index class contains the at least one additional real attribute as a virtual attribute.

14. The computer readable medium of claim 13 that includes program instructions for (c) searching for the virtual attribute.

15. The computer readable medium of claim 14, wherein searching (c) further comprises:
   (c1) searching the at least one child index class for a real attribute related to the virtual attribute;
   (c2) obtaining the corresponding parent index class for each search hit in the at least one child index class;
   (c3) building a list of the obtained parent index classes; and
   (c4) returning the list of parent index classes with the virtual attribute.

16. A computer readable medium containing program instructions for handling attributes in a document management, the program instructions for:
   (a) defining a document index class having a plurality of attributes;
   (b) defining a folder index class having one attribute;
   (c) obtaining all parent folders corresponding to the folder index class;
   (d) obtaining an attribute and appending the attribute to a list for each obtained parent folder; and
   (e) obtaining single-valued attributes of a document and returning the single-valued attributes to the list for each obtained parent folder.

* * * * *